United States Patent [19]

Inoue et al.

[11] Patent Number: 5,229,892

[45] Date of Patent: Jul. 20, 1993

[54] TIME BASE CORRECTOR HAVING A VELOCITY ERROR DATA EXTRACTING CIRCUIT

[75] Inventors: Takashi Inoue, Osaka; Nobuyuki Ogawa, Takatsuki; Hiromu Kitaura, Osakasayama; Tokikazu Matsumoto, Osaka, all of Japan

[73] Assignee: Matsushita Electric Industrial Co., Ltd., Osaka, Japan

[21] Appl. No.: 712,041

[22] Filed: Jun. 7, 1991

[30] Foreign Application Priority Data

Jun. 14, 1990 [JP] Japan .................. 2-156889

[51] Int. Cl.[5] ............................. H04N 5/78
[52] U.S. Cl. .................... 360/36.2; 358/149
[58] Field of Search ............ 360/36.1, 36.2, 32, 360/26, 38.1; 358/149, 13, 19, 17, 337, 167, 320, 326, 148

[56] References Cited

U.S. PATENT DOCUMENTS

| | | | |
|---|---|---|---|
| 4,165,524 | 8/1979 | Ninomiya | 360/36 |
| 4,251,830 | 2/1981 | Tatami | 360/36.2 |
| 4,393,413 | 7/1983 | Kaneko | 360/36.1 |

FOREIGN PATENT DOCUMENTS

| | | |
|---|---|---|
| 51-116613 | 10/1976 | Japan . |
| 53-148317 | 12/1978 | Japan . |
| 57-106285 | 7/1982 | Japan . |

Primary Examiner—Edward P. Westin
Assistant Examiner—Que T. Le
Attorney, Agent, or Firm—Wenderoth, Lind & Ponack

[57] ABSTRACT

A time base correcting circuit is provided in which a time base error in a video signal is corrected by converting the video signal to a digital form which is then recorded into a memory with a write-in clock signal synchronized with a horizontal synchronizing signal or a color burst signal carried in the video signal, reading the digital signal with a read-out clock signal generated from a reference clock signal, and converting it into an analog form. In particular, a velocity error data is added to a corresponding horizontal blanking period of the video signal and after processing of the signals having time delays and continuation errors in the time base, the velocity error data is extracted from the horizontal blanking period of the video signal. Then, the read-out clock signal is phase modulated with the velocity error data extracted and used for correction of the velocity error in the video signal of analog form converted from its digital form.

4 Claims, 3 Drawing Sheets

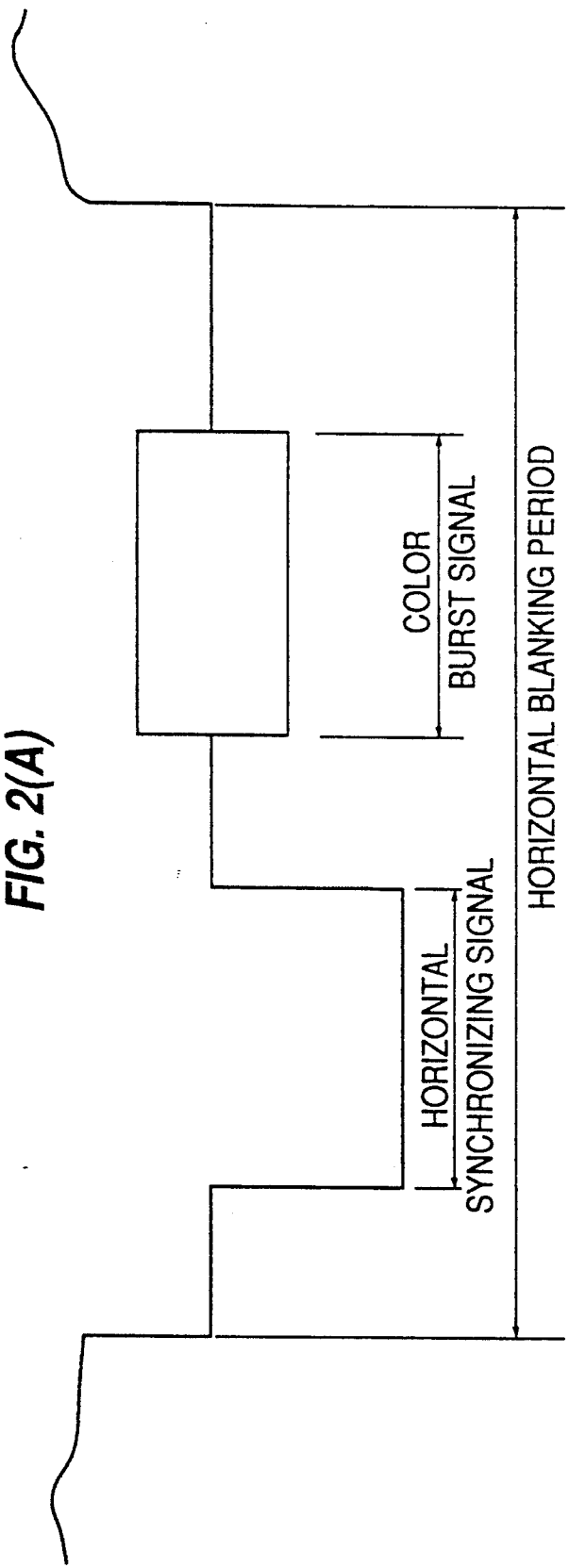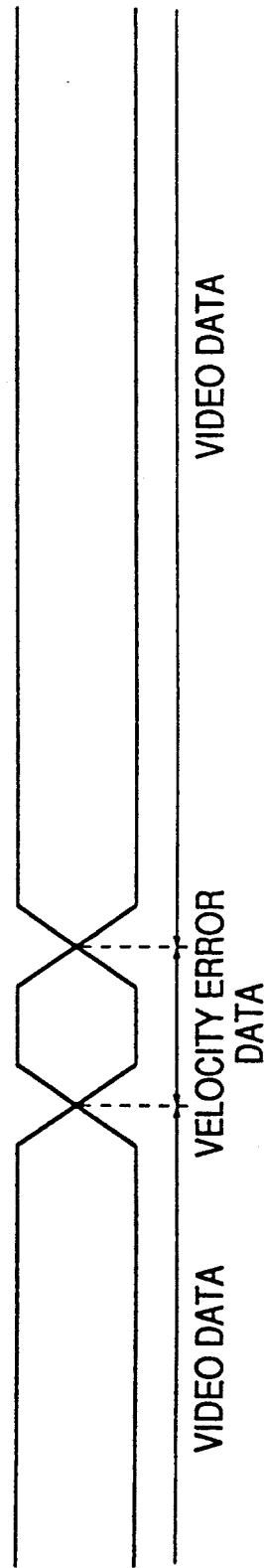

TIME BASE CORRECTOR HAVING A VELOCITY ERROR DATA EXTRACTING CIRCUIT

BACKGROUND OF THE INVENTION

1. Field of the Invention

This invention relates to a time base corrector for correcting fluctuations in a video signal transmitted through a transmission line or reproduced from a recording medium.

2. Description of the Prior Art

Such a conventional time base corrector is known that converts an input video signal by an A/D converter to a digital signal, records the digital signal into a memory operated by a write-in clock signal, reads the recorded signal from the memory by a standard clock, and converts the read-out signal back to its analog form. The write-in clock signal is arranged to synchronize with a horizontal synchronizing signal or a color burst signal carried in the input video signal and contains a phase shift equivalent to a time base error in either the horizontal synchronizing or color burst signal. The detection of the time base error in the horizontal synchronizing or color burst signal is executed during a horizontal scanning period. Accordingly, a time base error within one horizontal scanning period is no more corrected and remains as a velocity error.

For compensation for the velocity error, it is schemed that the read-out clock signal is phase modulated corresponding to a velocity error data fed from the write-in clock signal generating circuit and used for reading from the memory a desired data which is in turn converted to an analog form for output.

Such apparatus is disclosed in the form of a time base corrector in U.S. Pat. No. 4,165,524.

In this apparatus, the phase shift of the read-out clock signal is determined in proportion to a video data to be retrieved and hence, the video data has to be converted to an analog form immediately after read out from the memory with the read-out clock signal.

Accordingly, when a signal processing associated with time delays or continuation errors in the time base is conducted between the memory and the D/A converter, the timing between the video data to be D/A converted and the velocity error data to be used for phase modulation of the read-out clock signal will fail to keep up with. For example, a timing error will likely occur during the edge enhancement with the use of a line memory or reproduction of a still picture with field or frame memories. As the result, the velocity error can be no longer compensated but ironically enhanced.

Also, the processing of signals read from the memory through such an arithmetic operation as including in-line and in-field calculation involves computation of the video signals having different velocity errors. Hence, the velocity error itself becomes different from the one before the arithmetic operation. In addition to the timing error between the velocity error and the video data, another problem arises that the video data released from a calculating circuit fails to correspond with the velocity error data and thus, no exact compensation for the velocity error will be executed.

SUMMARY OF THE INVENTION

It is an object of the present invention to provide a time base corrector in which a velocity error can appropriately be corrected regardless of processing of signals having time delays or continuation errors in the time base and arithmetic operation between different scanning lines.

For achievement of the foregoing object, a time base corrector according to the present invention comprises means for adding a velocity error data of digital form to a horizontal blanking period of a digital video signal which contains a velocity error, means for extracting the velocity error data from the velocity-error-data-carrying digital video signal, and means for correcting the velocity error in the video signal with the use of the velocity error data extracted.

Accordingly, even during the arithmetic operation between different scanning lines or the processing of signals having time delays or continuation errors in the time base, exact correction of a velocity error can be conducted with the use of a velocity error data which has been extracted from the horizontal blanking period of a digital video signal before the A/D conversion.

BRIEF DESCRIPTION OF THE DRAWINGS

FIGS. 2A-2B is a waveform diagram showing the addition of a velocity error data.

DESCRIPTION OF THE PREFERRED EMBODIMENTS

Figure 1:
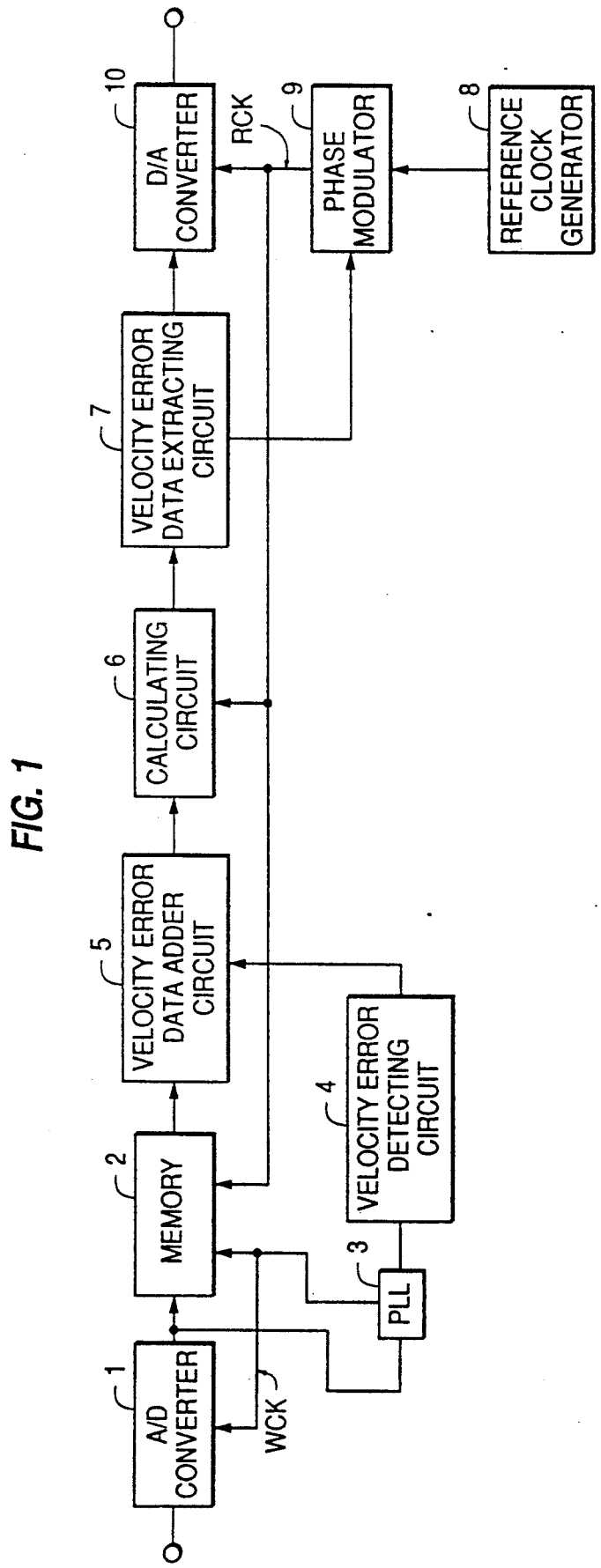
FIG. 1 is a block diagram of a time base corrector showing a first embodiment of the present invention.

FIG. 1 is a block diagram of a time base corrector showing a first embodiment of the present invention. As shown, there are provided an A/D converter 1 for conversion of an input video signal of analog form containing a time base error into a digital video signal, a memory 2 for storage of the digital video signal, which is controlled by a write-in clock signal WCK for write operation and a read-out clock signal RCK for read operation, a phase locked loop circuit 3 (abbreviated to PLL) for generating the write-in clock signal WCK which is synchronized with a horizontal synchronizing signal or a color burst signal, a velocity error detector circuit 4 for detecting a velocity error from the residual errors in the PLL 3, a velocity error data adder circuit 5 for adding the velocity error data to a corresponding horizontal blanking period of the digital video signal, a calculating circuit 6 for arithmetic operation of video signals of different scanning lines, a velocity error data extracting circuit 7 for extracting the velocity error data from the horizontal blanking period of the digital video signal, a reference clock generator 8 for generating a fixed clock signal, a phase modulator 9 for phase modulating the fixed clock signal to produce the read-out clock signal RCK in accordance with the velocity error data, and a D/A converter for conversion of the digital video signal to an analog video signal in response to the read-out clock signal RCK.

In practice, the input video signal which contains a time base error is transmitted from a transmission line or reproduced from a recording medium.

The PLL 3 produces a write-in clock signal WCK which is synchronized in the frequency with a horizontal synchronizing signal or a color burst signal carried in the input video signal. The write-in clock signal allows the input video signal to be converted by the A/D converter 1 into a digital form which is in turn stored in the memory 2. Because both the horizontal synchronizing and color burst signals are carried once for a horizontal scanning period, the time base error in the input video signal can be detected in each horizontal scanning period.

Accordingly, the time base error or velocity error in one horizontal scanning period gives no effect to the readout clock signal. The velocity error is detected as a digital data by the velocity error detecting circuit 4 from the residual errors generated at the PLL 3 in each horizontal scanning period. The digital velocity error data detected by the velocity error detecting circuit 4 is then added by the velocity error adder circuit 10 to a corresponding blanking period of the digital video signal.

FIG. 2 shows a velocity error data added to a horizontal blanking period of the horizontal synchronizing signal. Represented by the letter A is a video signal expressed in the analog form for simplicity of explanation of the addition. More particularly, the velocity error data is superimposed on the horizontal synchronizing signal as denoted by B in FIG. 2.

The digital video signal with the velocity error data added is then processed by the calculating circuit 6 for arithmetic operation with other video signals of different scanning lines, e.g. vertical edge compensation using a line memory or noise reduction using a field or frame memory. After the arithmetic operation of the video signals of different scanning lines by delaying the same with a line or frame memory, the velocity error in each digital video signal is varied.

For adjustment, the calculating circuit 6 also performs arithmetic operation of the velocity error data added to the horizontal blanking period. As the digital video signal is time delayed by the use of the line or field memory, the velocity error data added to the horizontal blanking period is equally delayed.

Subsequently, the velocity error data extracting circuit 7 extracts the velocity error data from the horizontal blanking period of the digital video signal and transfers it to the phase modulator 9. Accordingly, the velocity error data becomes timed with the digital video signal which is to be converted back to its analog form.

The phase modulator 9 generates a read-out clock signal RCK through phase modulating the fixed clock pulse, which is fed from the reference clock generator 8, according to the velocity error data. The read-out clock signal RCK triggers the D/A conversion of the digital video signal to its analog form in which the time base error is corrected.

As set forth above, the first embodiment provides the velocity error data adder circuit and the velocity error data extracting circuit arranged before and after the calculating circuit respectively, whereby each velocity error will appropriately be corrected regardless of the arithmetic operation of video signals of different scanning lines having time delays.

Figure 3:
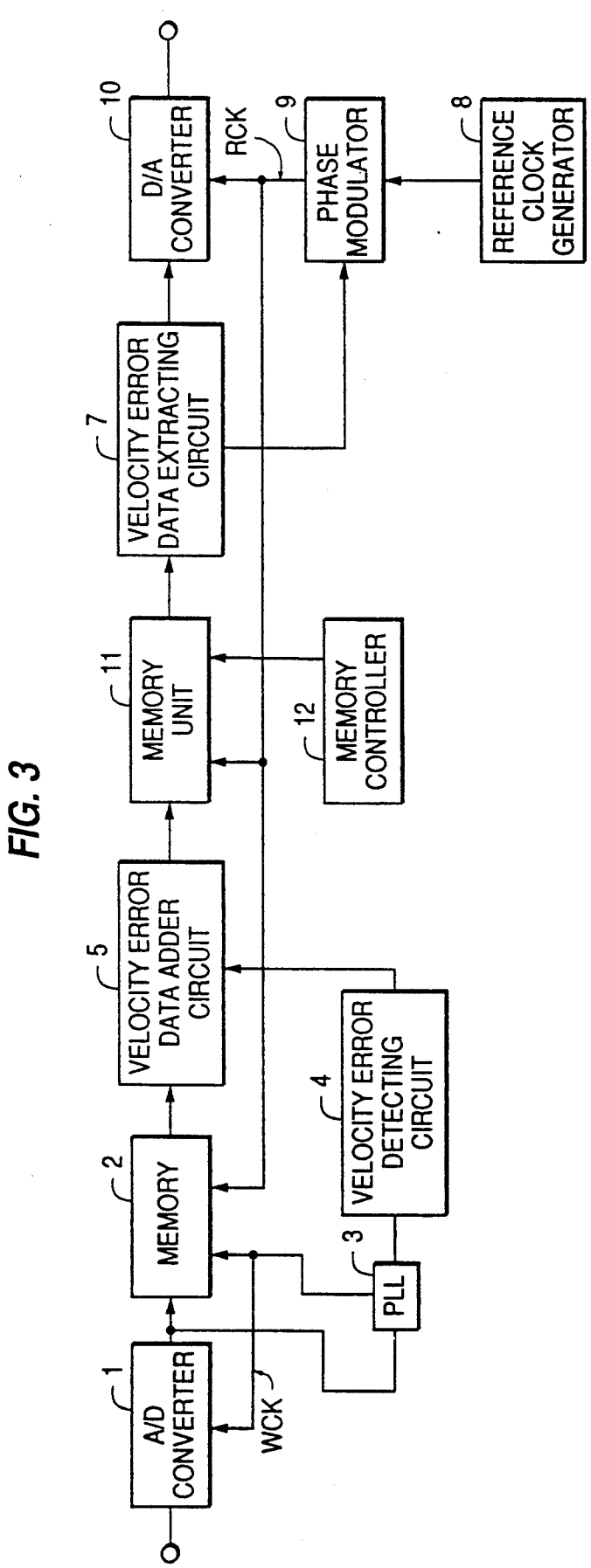
FIG. 3 is a block diagram of another time base corrector showing a second embodiment of the present invention.

FIG. 3 is a block diagram of another time base corrector showing a second embodiment of the present invention, in which like numerals represent like components as denoted in FIG. 1. There are provided a memory unit 11 for storage of the digital video signal and a memory controller 12 for control of the memory unit 11.

Steps of a procedure up to the addition of a velocity error data to the horizontal blanking period of each digital video signal are the same as of the first embodiment. For display of a still picture, the memory controller 12 stops a write action on the memory unit 11 and instructs the memory unit 11 to repeat a reading of the same data. As the result, the continuation of the time base is interrupted during playback of a still picture.

Similarly, the velocity error data is extracted by the velocity error data extracting circuit 7 from the horizontal blanking period of the digital video signal. Although the video signal becomes discontinuous in the time base, it is in timing with the velocity error data.

The phase modulator 9 generates a read-out clock signal RCK through phase modulating the fixed clock pulse, which is fed from the reference clock generator 8, according to the velocity error data. The read-out clock signal RCK triggers the D/A conversion of the digital video signal to its analog form in which the time base error is corrected.

As set forth above, the second embodiment provides both the velocity error data adder circuit and the velocity error data extracting circuit arranged before and after the memory unit respectively, whereby each velocity error will appropriately be corrected regardless of the arithmetic operation rendering the time base discontinuous.

What is claimed is:

1. A time base corrector comprising:
   means for adding a velocity error data of digital form to a horizontal blanking period of a digital video signal which contains a velocity error;
   means for extracting the velocity error data from the velocity-error-data-carrying digital video signal; and
   means for correcting the velocity error in the video signal with the use of the velocity error data extracted.

2. A time base corrector according to claim 1, further comprising means for calculating the velocity error data added to the horizontal blanking period of a digital video signal of a different scanning line.

3. A time base corrector according to claim 1, further comprising a memory unit for storage of the digital video signal with the velocity error data added thereto.

4. A time base corrector comprising:
   an analog-to-digital converter for converting an input video signal having a velocity error to a digital video signal;
   a velocity error detecting circuit for detecting a velocity error of said digital video signal and generating a velocity error data indicative of said velocity error;
   a velocity error adding circuit for adding said velocity error data to said digital video signal in a horizontal blanking period;
   a signal processing circuit for subjecting an output signal of said velocity error adding circuit to a predetermined signal processing in which a relation between the input video signal and its velocity error is lost;
   a velocity error extracting circuit for extracting said velocity error data from an output signal of said signal processing circuit;
   a read clock generating circuit for phase modulating a reference clock by said velocity error data extracted by said velocity error extracting circuit to generate a read clock; and
   a digital-to-analog converter operated by said read clock for converting the output signal of said signal processing circuit to an analog signal which is corrected of the velocity error.

* * * * *